United States Patent
Fiske et al.

(10) Patent No.: US 7,959,177 B2
(45) Date of Patent: *Jun. 14, 2011

(54) MOTOR VEHICLE OPERATOR IDENTIFICATION AND MAXIMUM SPEED LIMITER

(75) Inventors: Richard Fiske, Shrewsbury, MA (US); Andy Surabian, Shrewsbury, MA (US); Kevin Weigold, Shrewsbury, MA (US)

(73) Assignee: Kar Enterprises, LLC, Shrewsbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/793,059

(22) Filed: Jun. 3, 2010

(65) Prior Publication Data

US 2010/0241313 A1 Sep. 23, 2010

Related U.S. Application Data

(63) Continuation of application No. 11/486,486, filed on Jul. 14, 2006, now Pat. No. 7,757,803.

(51) Int. Cl.
*B60D 1/28* (2006.01)
(52) U.S. Cl. ...................................................... 280/271
(58) Field of Classification Search .............. 180/271, 180/272, 282; 701/70
See application file for complete search history.

(56) References Cited

U.S. PATENT DOCUMENTS

| | | | |
|---|---|---|---|
| 4,734,693 A | 3/1988 | Dluhosch et al. | |
| 4,990,906 A | 2/1991 | Kell et al. | |
| 5,552,789 A | 9/1996 | Schuermann | |
| 5,635,916 A | 6/1997 | Bucholtz et al. | |
| 5,757,086 A | 5/1998 | Nagashima | |
| 5,801,616 A | 9/1998 | Ghazarian et al. | |
| 5,808,543 A | 9/1998 | Peyre | |
| 5,829,782 A | 11/1998 | Breed et al. | |
| 6,078,265 A | 6/2000 | Bonder et al. | |
| 6,198,996 B1 | 3/2001 | Berstis | |
| 6,240,773 B1 | 6/2001 | Rita et al. | |
| 6,278,358 B1 | 8/2001 | Spoto et al. | |
| 6,362,734 B1 | 3/2002 | McQuade et al. | |
| 6,386,007 B1 | 5/2002 | Johnson et al. | |
| 6,430,488 B1 | 8/2002 | Goldman et al. | |
| 6,501,369 B1 | 12/2002 | Treharne | |

(Continued)

FOREIGN PATENT DOCUMENTS

DE   199 61 619 A1   6/2001

(Continued)

OTHER PUBLICATIONS http://science.howstuffworks.com/engineering/civil/ginger.htm/printable, printed Mar. 1, 2011.

*Primary Examiner* — Faye M. Fleming
(74) *Attorney, Agent, or Firm* — Wolf, Greenfield & Sacks, P.C.

(57) ABSTRACT

A programmable device that interfaces with a motor vehicle. The device is programmed to identify the operator who is gaining access to the motor vehicle. The device is further programmed to associate a maximum allowable speed with each person allowed to operate the motor vehicle. The device incorporates an access and operation means together with a computer that is compatible with the motor vehicle on board computer. The computer includes in it's output a signal that controls the maximum allowable speed that the on board computer will permit the motor vehicle to operate at for the identified operator.

12 Claims, 1 Drawing Sheet

U.S. PATENT DOCUMENTS

| | | |
|---|---|---|
| 6,501,374 B1 | 12/2002 | King et al. |
| 6,518,882 B2 | 2/2003 | Johnson et al. |
| 6,573,615 B1 | 6/2003 | Asakura et al. |
| 6,647,328 B2 | 11/2003 | Walker |
| 6,659,360 B1 | 12/2003 | Schaefer et al. |
| 6,675,082 B2 | 1/2004 | Galli et al. |
| 6,772,061 B1 | 8/2004 | Berthiaume et al. |
| 6,785,595 B2 | 8/2004 | Kominami et al. |
| 6,806,810 B2 | 10/2004 | Robinson |
| 6,870,459 B1 | 3/2005 | Fest et al. |
| 6,871,132 B2 | 3/2005 | Olsen et al. |
| 6,897,767 B2 | 5/2005 | Kim |
| 6,909,947 B2 | 6/2005 | Douros et al. |
| 6,970,075 B2 | 11/2005 | Cherouny et al. |
| 7,006,914 B1 | 2/2006 | Cahoon |
| 7,042,347 B2 | 5/2006 | Cherouny |
| 7,075,409 B2 | 7/2006 | Guba |
| 7,184,873 B1 | 2/2007 | Idsinga et al. |
| 7,271,712 B2 | 9/2007 | Rubel |
| 7,315,779 B1 | 1/2008 | Rioux et al. |
| 7,394,401 B2 | 7/2008 | De Wilde et al. |
| 7,653,467 B2 | 1/2010 | Bachmann et al. |
| 2002/0170762 A1 | 11/2002 | Daneshmand |
| 2004/0074682 A1 | 4/2004 | Fussey et al. |
| 2004/0234109 A1 | 11/2004 | Lemelson et al. |
| 2004/0262068 A1 | 12/2004 | Matsubara et al. |
| 2004/0263316 A1 | 12/2004 | Dix et al. |
| 2005/0203752 A1 | 9/2005 | Shinada |
| 2006/0082434 A1 | 4/2006 | Brey |
| 2006/0114101 A1 | 6/2006 | Schambeck et al. |
| 2006/0229784 A1 | 10/2006 | Bachmann et al. |
| 2006/0273885 A1 | 12/2006 | Thompson |
| 2007/0126604 A1 | 6/2007 | Thacher |

FOREIGN PATENT DOCUMENTS

| | | |
|---|---|---|
| DE | 100 64 141 A1 | 7/2002 |
| DE | 10 2005 007 865 A1 | 9/2006 |
| EP | 1 101 670 A2 | 5/2001 |
| EP | 1 191 486 A1 | 3/2002 |
| EP | 1 728 945 A1 | 12/2006 |
| JP | 2006-129223 | 5/2006 |
| JP | 2008265676 A | 11/2008 |
| WO | 01/25572 A1 | 4/2001 |
| WO | 2007/133994 A2 | 11/2007 |

MOTOR VEHICLE OPERATOR IDENTIFICATION AND MAXIMUM SPEED LIMITER

RELATED APPLICATIONS

This application is a continuation application and claims the benefit under 35 U.S.C. §120 of U.S. application Ser. No. 11/486,486, entitled "MOTOR VEHICLE OPERATOR IDENTIFICATION AND MAXIMUM SPEED LIMITER" filed on Jul. 14, 2006, which is herein incorporated by reference in its entirety.

BACKGROUND OF THE INVENTION

The present invention involves motor vehicles. In particular the maximum allowable speed that the motor vehicle may be operated at by a particular operator. As recent events have demonstrated an inexperienced motor vehicle operator will often have difficulty safely operating a motor vehicle at high speeds. The inexperienced operator has not developed the necessary skills to properly react when the road suddenly curves to the left or right. There are many other situations that the inexperienced operator lacks the ability to properly deal with. The result is often tragedy, sometimes resulting in death to the operator, passengers and occupants of a second or third motor vehicle. Although there are many well qualified driver education courses available, there is no substitute for experience. The problem is that motor vehicles are not designed to evaluate the operator as to experience or competence. Motor vehicles, as presently marketed, will allow any operator to drive the motor vehicle at any speed regardless of the situation or experience level of the operator.

The present invention provides a solution to this problem by identifying the operator when the operator goes to gain access to the motor vehicle or to operate same. The access and operation device used by the operator is usually the standard ignition key. The problem is that once access and operation is achieved there is no restriction on the maximum speed at which the operator may drive the vehicle. The present invention uses a device, which may be an ignition key that incorporates a computer chip, to identify the operator and further the maximum motor vehicle speed that may be attained by that particular operator. Upon the identity of the operator being established the access and operation device will provide an input to a computer on the motor vehicle, this may be the standard on board computer. The input includes a maximum allowable speed that the motor vehicle may be operated at. This maximum allowable speed would be different for each operator that is allowed to operate the motor vehicle. In addition the maximum speed may be adjusted (increased or decreased) from time to time, depending on the circumstances and increased driving experience of the operator.

There are other options to using an ignition key, with a computer chip incorporated therein, to identify a specific operator together with a maximum allowable motor vehicle operating speed. For instance: an access pad that requires the operator to enter a code before the vehicle may be started could include a maximum allowable motor vehicle speed along with the operators identity. The problem with either of the foregoing is that any operator could obtain another operators ignition key or entry code. The motor vehicle would not know if the actual operator is the same person as identified by the ignition key or entry code. Therefore to make the system work there would need to be a certain level of security involving the storage of ignition keys or knowledge of entry codes. In order to eliminate the possibility of an operator making use of another operators ignition key or entry code an entry device could be used that required positive voice, finger print, eye scan or other physical feature identification to permit access and operation. Such a system could be expensive, however how much is a life worth?

The present invention is a new and improved device for limiting the maximum allowable speed of a motor vehicle based upon the identity of the operator. The maximum allowable speed may be determined separately for each operator of the motor vehicle. In addition the maximum allowable speed may be adjusted for each operator, from time to time, depending on the operators level of expertise and experience.

An object of the invention is to provide a device that limits the maximum allowable speed of a motor vehicle for each individual that operates the motor vehicle.

Another object of the invention is to permit adjustments to the maximum allowable speed for any individual depending on changes in circumstances.

A further object of the invention is to limit the maximum operating speed of the motor vehicle to prevent an inexperienced operator from exceeding normal speed limits.

A still further object of the invention is to reduce and possibly eliminate motor vehicle accidents involving inexperienced operators driving the motor vehicle at excessive speeds.

SUMMARY OF THE INVENTION

The present invention involves a system to control the maximum speed at which a motor vehicle may be operated. The system further allows for flexibility in that the maximum allowable speed may be different depending on who is operating the motor vehicle. For instance the maximum speed for a new inexperienced operator could be lower than that for a more experienced operator. In addition the maximum speed for any operator could be increased or reduced from time to time as the situation may dictate.

The system may involve the use of an ignition key that incorporates a programmable chip. The programmable chip interacts with a computer, that may be the standard on board computer, to control the motor vehicles maximum speed. The computer (standard on board or otherwise) senses the motor vehicle speed. When the motor vehicle speed reaches the maximum speed, programmed into the ignition key chip, the computer limits any further increase in the motor vehicles speed. The computer could control the maximum motor vehicle speed by any number of ways including: limiting the fuel flow to the engine; interrupting the spark or causing a limit or interruption of some other component of the engine that has the result of preventing the motor vehicle from any further increase in speed. This limitation on any further increase in speed of the motor vehicle would take into account safety considerations and not create an unsafe rapid reduction in speed or a loss of control.

The system could involve the use of some other device, electronic or otherwise that may not require the use of an ignition key, that is capable of identifying the operator and further permitting operation of the motor vehicle. Such devices could include: touch pads, that involve the use of a series of numbers to permit access to the motor vehicle, including the identity of the operator, and thereafter allow operation thereof, scanners that identify the operator, (by scanning a finger, eye or other body part) to permit access to the motor vehicle, and thereafter allow operation thereof; or computers that are activated by sound, smell or other characteristic to identify the operator to permit access to the motor vehicle, and thereafter allow operation thereof. It is assumed that all of the foregoing are capable of being programmed to identify the specific operator and further to interact with the standard on board computer, or such other computer, that senses the motor vehicle speed, to control the maximum motor vehicle speed. In the event that the access and operation device is only capable of identifying the operator then the standard on board computer, or additional computer, would need to be capable of being programmed to control the maximum motor vehicle speed based upon the identity of the operator as sensed.

While the invention will be discussed in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

BRIEF DESCRIPTION OF THE DRAWINGS

The object and features of the invention may be understood with reference to the following detailed description of an illustrative embodiment of the invention, taken together with the accompanying drawings in which.

BRIEF DESCRIPTION OF THE PREFERRED EMBODIMENT

Figure 1:
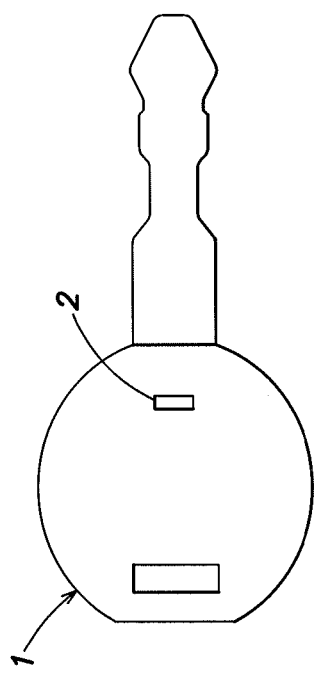
FIG. 1 illustrates an ignition key 1. with a programmable chip 2., incorporated therein.
Figure 2:
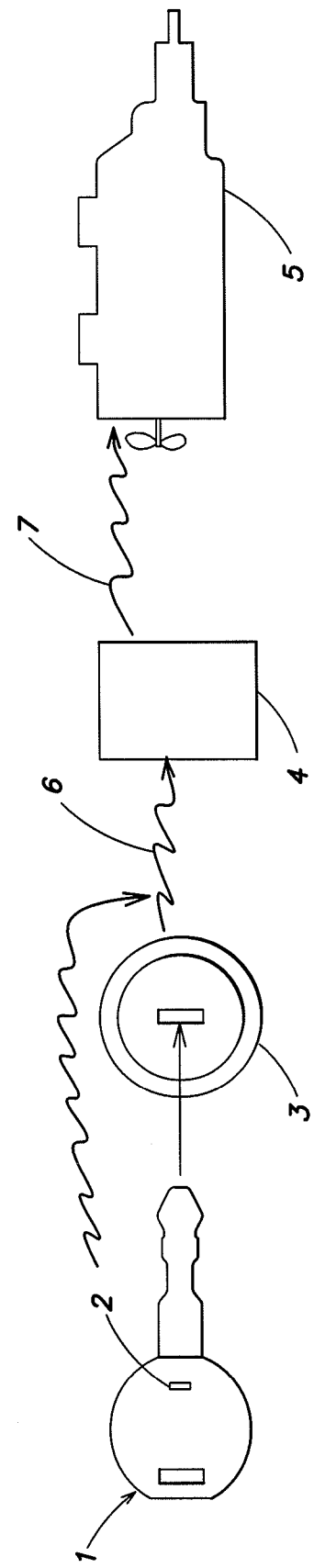
FIG. 2 illustrates the system where the ignition key 1. would be inserted into the ignition 3. The information from the programmable chip 2. is transmitted to the on board computer 4. as illustrated by wavy line 6. The information, as to maximum allowable speed of the motor vehicle, is transmitted from the on board computer 4. to the engine 5. as illustrated by wavy line 7.

The present invention involves a motor vehicle ignition key that incorporates a chip, as shown in FIG. 1. The ignition key chip is programmed to include specific information as to the operator of the motor vehicle. The information identifies the operator and further indicates a maximum allowable operating speed for the motor vehicle for that specific operator. The ignition key chip interacts with a computer positioned in the motor vehicle. The computer which, may be the motor vehicles on board computer, includes the speed of the motor vehicle in the input data processed. The computer further is able to output data that would limit the maximum speed of the motor vehicle, as illustrated in FIG. 2. The ignition key chip is programmable in order that the maximum allowable motor vehicle speed can be a unique speed for each of the potential operators of the motor vehicle. Further the ignition key chip may be reprogrammed in order that the maximum allowable speed for any specific operator may be increased or decreased from time to time.

There may be a number of ignition keys for the motor vehicle providing a variety of maximum speeds. By having a number of ignition keys with chips programmed for different maximum speeds allows different users of the motor vehicle to be limited as to the maximum speed at which the individual may operate the motor vehicle. The ignition key chip may also be capable of being reprogrammed allowing for a temporary or progressive change in the maximum allowable speed for the motor vehicle.

It is anticipated that the standard state of art, on board computer, is capable of being used with no programming to accept the input from the ignition key chip and provide an output that would limit the motor vehicles maximum speed.

In the event the standard on board computer requires programming to accept the input from the ignition key chip and further provide an output in order to limit the motor vehicles maximum speed it is believed that such programming should be relatively easy. Should the standard on board computer be incapable of being programmed to accept the input from the ignition key chip and further to limit the motor vehicles maximum speed a separate computer may be incorporated in the system to accept the input from the ignition key chip and provide the output to limit the motor vehicle maximum speed.

It is further understood that the manner of staring and operating a motor vehicle that presently involves the use of an ignition key may be modified to include the use of operator identification devices such as: user code; voice prints; finger prints; eye identification; or other user specific identification. The means whereby the operator is identified and authorized will include information that indicates the maximum speed that is allowed for the specific individual. The computer on the motor vehicle will operate in the same fashion as for the ignition key chip.

There may be restrictions on the ability of the access means to provide information as to both the operators identity and maximum allowable motor vehicle speed. In such event the on board computer may be programmed to determine the maximum allowable speed based on the identity of the operator as provided by the access means. Another alternative would be for the access means to only provide input to the on board computer as to the maximum allowable speed for the user of the access means.

From the foregoing description it will be apparent that modifications can be made to the device without departing from the teaching of the present invention. Accordingly, it is distinctly understood that the invention is not limited to the preferred embodiment but may be embodied and practiced within the scope of the following claims.

What is claimed:

1. An automotive vehicle comprising:
an on-board computer configured to control the automotive vehicle to a maximum speed;
a first ignition key useable to gain access to the automotive vehicle and permit operation of the automotive vehicle, the first ignition key adapted to communicate information to the on-board computer, the on-board computer being arranged to receive the information from the first ignition key and limit the automotive vehicle to a maximum speed based on the information, the on-board computer being reprogrammable from limiting the automotive vehicle to a first maximum speed based on the information from the first ignition key to limiting the automotive vehicle to a second maximum vehicle speed based on the information from the first ignition key.

2. The vehicle according to claim 1, wherein the first ignition key includes a computer chip that is programmed to include identification information.

3. The vehicle according to claim 1, further comprising a second ignition key that is useable to gain access to the automotive vehicle and permit operation of the automotive vehicle, the second ignition key adapted to communicate information that causes the vehicle on-board computer to limit the vehicle to a third maximum speed that is different from the first maximum speed.

4. The vehicle according to claim 1, wherein the first ignition key comprises a chip.

5. The vehicle according to claim 4, wherein the chip is programmable.

6. A system for controlling a speed of an automotive vehicle, the system comprising:

an on-board computer configured to cause control of at least one vehicle operating parameter of the automotive vehicle;

an ignition key that is useable to gain access to the automotive vehicle and permit operation of the automotive vehicle, the ignition key adapted to communicate information to the on-board computer;

wherein the on-board computer is configured to receive the information from the ignition key and cause control of the at least one vehicle operating parameter based on the information, control of the at least one vehicle operating parameter causing the automotive vehicle to be limited to a first speed based on the information from the ignition key, and wherein the on-board computer is reprogrammable, causing a change in the at least one vehicle operating parameter allowing a speed of the automotive vehicle that is greater than the first speed based on the information from the ignition key.

7. The vehicle according to claim 6, wherein the ignition key includes a computer chip that is programmed to include identification information.

8. The vehicle according to claim 6, wherein the ignition key comprises a chip.

9. The vehicle according to claim 8, wherein the chip is programmable.

10. A method for controlling a speed of an automotive vehicle, the automotive vehicle including an on-board computer, the method comprising:

receiving information from a vehicle ignition key by the on-board computer, the vehicle ignition key useable to gain access to the automotive vehicle and permit operation of the automotive vehicle;

programming the on-board computer, allowing the on-board computer, based on the information from the vehicle ignition key, to cause control of at least one vehicle operating parameter limiting the automotive vehicle to a first speed;

re-programming the on-board computer, allowing the on-board computer, based on the information from the vehicle ignition key, to cause control of the at least one vehicle operating parameter to allow operation of the automotive vehicle at a speed greater than the first speed.

11. The method according to claim 10, further comprising programming the vehicle ignition key with identification information.

12. The method according to claim 10, further comprising:

receiving information from a second vehicle ignition key by the on-board computer, the second vehicle ignition key useable to gain access to the automotive vehicle and permit operation of the automotive vehicle;

programming the on-board computer, allowing the on-board computer, based on the information from the second vehicle ignition key, to cause control of at least one vehicle operating parameter limiting the automotive vehicle to a second speed;

re-programming the on-board computer, allowing the on-board computer, based on the information from the second vehicle ignition key, to cause control of the at least one vehicle operating parameter to allow operation of the automotive vehicle at a speed greater than the second speed.

* * * * *

UNITED STATES PATENT AND TRADEMARK OFFICE
CERTIFICATE OF CORRECTION

Page 1 of 1

PATENT NO. : 7,959,177 B2
APPLICATION NO. : 12/793059
DATED : June 14, 2011
INVENTOR(S) : Richard Fiske et al.

It is certified that error appears in the above-identified patent and that said Letters Patent is hereby corrected as shown below:

**In the Claims:

At column 5, Claim 7, line 19: Please delete "vehicle" and insert --system--.

At column 5, Claim 8, line 22: Please delete "vehicle" and insert --system--.

At column 5, Claim 9, line 24: Please delete "vehicle" and insert --system--.**

Signed and Sealed this
Sixteenth Day of August, 2011

David J. Kappos
*Director of the United States Patent and Trademark Office*